b

(12) United States Patent
Keigley

(10) Patent No.: US 10,508,411 B2
(45) Date of Patent: *Dec. 17, 2019

(54) GRADING TOOLS FOR WORK MACHINES AND OPERATION THEREOF

(71) Applicant: ABI ATTACHMENTS, INC., Mishawaka, IN (US)

(72) Inventor: Kevin V. Keigley, Osceola, IN (US)

(73) Assignee: ABI ATTACHMENTS INC., Mishawaka, IN (US)

( * ) Notice: Subject to any disclaimer, the term of this patent is extended or adjusted under 35 U.S.C. 154(b) by 352 days.

This patent is subject to a terminal disclaimer.

(21) Appl. No.: 15/437,575

(22) Filed: Feb. 21, 2017

(65) Prior Publication Data

US 2017/0159266 A1  Jun. 8, 2017

Related U.S. Application Data

(63) Continuation of application No. 14/513,332, filed on Oct. 14, 2014, now Pat. No. 9,609,796.

(60) Provisional application No. 61/891,929, filed on Oct. 17, 2013.

(51) Int. Cl.
| | |
|---|---|
| *E02F 3/76* | (2006.01) |
| *A01B 63/108* | (2006.01) |
| *A01B 31/00* | (2006.01) |
| *A01B 63/111* | (2006.01) |
| *E02F 3/815* | (2006.01) |
| *E02F 3/84* | (2006.01) |

(52) U.S. Cl.
CPC ............ *E02F 3/7672* (2013.01); *A01B 31/00* (2013.01); *A01B 63/108* (2013.01); *A01B 63/111* (2013.01); *E02F 3/7609* (2013.01); *E02F 3/815* (2013.01); *E02F 3/844* (2013.01)

(58) Field of Classification Search
CPC ...... A01B 31/00; A01B 63/108; E02F 3/7672
USPC ........................................... 172/197
See application file for complete search history.

(56) References Cited

U.S. PATENT DOCUMENTS

| | | |
|---|---|---|
| 753,452 A | 3/1904 | Van Blunt |
| 1,333,854 A | 3/1920 | Kuiker |
| 1,856,148 A | 5/1932 | Ball |
| 2,358,298 A | 1/1942 | Benjamin |
| 2,292,488 A | 8/1942 | Stevens |
| 2,543,989 A | 3/1951 | Rockwell |
| 2,730,031 A | 1/1956 | Buhr |
| 2,743,655 A | 5/1956 | Reffenty |
| 3,004,611 A | 10/1961 | Tanke |
| 3,058,243 A | 10/1962 | McGee |
| 3,190,017 A | 6/1965 | Rockwell |
| 3,903,623 A | 9/1975 | Hyler |
| 3,978,597 A | 9/1976 | Brudnak, Jr. |

(Continued)

*Primary Examiner* — Thomas B Will
*Assistant Examiner* — Joel F. Mitchell
(74) *Attorney, Agent, or Firm* — Taft Stettinius & Hollister LLP

(57) ABSTRACT

One embodiment includes a grading tool structured for attachment to a work machine. The grading tool includes a frame, ground contacting wheels coupled with the frame, a comb coupled with the frame and extending from a first end of the frame, and a coupling member coupled with the frame and structured to be accessible from a second end of the frame. When the ground contacting wheels are in contact with the ground a depth of penetration of the comb into the ground surface is adjustable by changing the pitch of the grading tool.

19 Claims, 8 Drawing Sheets

(56) References Cited

U.S. PATENT DOCUMENTS

| | | |
|---|---|---|
| 4,024,796 A | 5/1977 | Theobald |
| 4,030,428 A | 6/1977 | Truax |
| 4,149,475 A | 4/1979 | Bailey |
| 4,194,757 A | 3/1980 | Lucas et al. |
| 4,261,115 A | 4/1981 | Chittenden |
| 4,491,183 A | 1/1985 | Anderson et al. |
| 4,518,043 A | 5/1985 | Anderson et al. |
| 4,554,977 A | 11/1985 | Vachon |
| 4,625,990 A | 12/1986 | Orth et al. |
| 4,630,526 A | 12/1986 | Burk et al. |
| 4,660,649 A | 4/1987 | Anderson et al. |
| 4,679,634 A | 7/1987 | Bulmahn |
| 4,693,331 A | 9/1987 | Johnson |
| 4,915,014 A | 4/1990 | Gilmore et al. |
| 4,936,390 A | 6/1990 | Anderson et al. |
| 5,065,681 A | 11/1991 | Hadley |
| 5,140,763 A | 8/1992 | Nichols |
| 5,201,372 A | 4/1993 | Thompson et al. |
| 5,373,902 A | 12/1994 | Lindblom |
| 5,413,181 A | 5/1995 | Kaigley |
| 5,462,389 A | 10/1995 | Messina |
| 5,515,625 A | 5/1996 | Keigley |
| 5,535,832 A | 7/1996 | Benoit |
| 5,797,460 A | 8/1998 | Parker et al. |
| 5,805,605 A | 9/1998 | Kaigley |
| 5,964,300 A | 10/1999 | Wattanville et al. |
| 6,076,612 A | 6/2000 | Carr et al. |
| 6,178,669 B1 | 1/2001 | Quenzi et al. |
| 6,263,977 B1 | 7/2001 | Mayerle et al. |
| 6,302,220 B1 | 10/2001 | Mayerle et al. |
| 6,378,619 B2 | 4/2002 | Mayerle et al. |
| 6,460,623 B1 | 10/2002 | Knuasman et al. |
| 6,606,956 B1 | 8/2003 | Paluch |
| 6,666,155 B2 | 12/2003 | Paluch et al. |
| 6,691,629 B2 | 2/2004 | Paluch et al. |
| 6,739,404 B2 | 5/2004 | Keigley |
| 6,810,609 B2 | 11/2004 | Lassonde et al. |
| 6,830,110 B2 | 12/2004 | Schlesser et al. |
| 7,055,698 B1 | 6/2006 | Keigley |
| 7,066,275 B1 | 6/2006 | Keigley |
| 7,178,605 B2 | 2/2007 | Williams et al. |
| 7,287,344 B2 * | 10/2007 | Kostyak ............... E02F 3/8152 37/407 |
| 7,478,682 B1 | 1/2009 | Keigley |
| 7,540,331 B1 | 6/2009 | Keigley |
| 7,543,401 B2 | 6/2009 | Hughes |
| 7,562,473 B2 * | 7/2009 | Westendorf et al. ..... E02F 3/40 37/268 |
| 7,918,285 B1 | 4/2011 | Graham et al. |
| 7,975,776 B2 | 7/2011 | Chimento et al. |
| 8,047,299 B2 | 11/2011 | Hurtis |
| 8,286,566 B2 | 10/2012 | Schilling |
| 8,555,798 B2 | 10/2013 | Schilling |
| 8,770,309 B2 | 7/2014 | Bauer |
| 8,944,176 B2 | 2/2015 | Kiser |
| 2001/0045294 A1 | 11/2001 | Mayerle et al. |
| 2003/0164125 A1 | 9/2003 | Paluch et al. |
| 2003/0164126 A1 | 9/2003 | Paluch et al. |
| 2004/0050564 A1 | 3/2004 | Wilson |
| 2004/0140109 A1 | 7/2004 | Schlesser et al. |
| 2004/0188114 A1 | 9/2004 | Schlesser et al. |
| 2005/0098327 A1 | 5/2005 | Williams et al. |
| 2006/0118313 A1 | 6/2006 | Nicholas |
| 2008/0236850 A1 | 10/2008 | Hawkes |
| 2009/0071666 A1 | 3/2009 | Ehrhart |
| 2010/0078185 A1 | 4/2010 | Carlz |
| 2011/0083867 A1 | 4/2011 | Leith |
| 2012/0234565 A1 | 8/2012 | Kiser et al. |
| 2012/0298388 A1 | 11/2012 | Bauer |
| 2013/0264080 A1 | 10/2013 | Keigley |
| 2015/0107861 A1 | 4/2015 | Keigley |

* cited by examiner

US 10,508,411 B2

GRADING TOOLS FOR WORK MACHINES AND OPERATION THEREOF

RELATED APPLICATIONS

This application is a continuation of U.S. patent application Ser. No. 14/513,332 filed on Oct. 14, 2014, which claims priority to U.S. Provisional Application No. 61/891,929 filed on Oct. 17, 2013, the disclosures of which are incorporated herein by reference.

BACKGROUND

A wide variety of earth moving tools and machines have been proposed. Conventional tools are generally suited for certain specific earth moving applications and operations, however, there remains a need for grading tools which can be coupled with a work machine, such as a skid steer, tractor or other vehicle or work machine with a front tool mounting capability, and operated in multiple modes to perform different grading functions and operations. There also remains a need for grading tools which are compatible with float mode operation of a work machine in which a grading tool is permitted to move passively in response to changes in the underlying ground surface while simultaneously providing for active operator control over the working depth of the tool. The unique and inventive embodiments disclosed herein offer a number of features, advantages, and benefits over to conventional tools which shall become apparent from the following disclosure and the figures.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art to which the invention relates.

DETAILED DESCRIPTION

Figure 1:
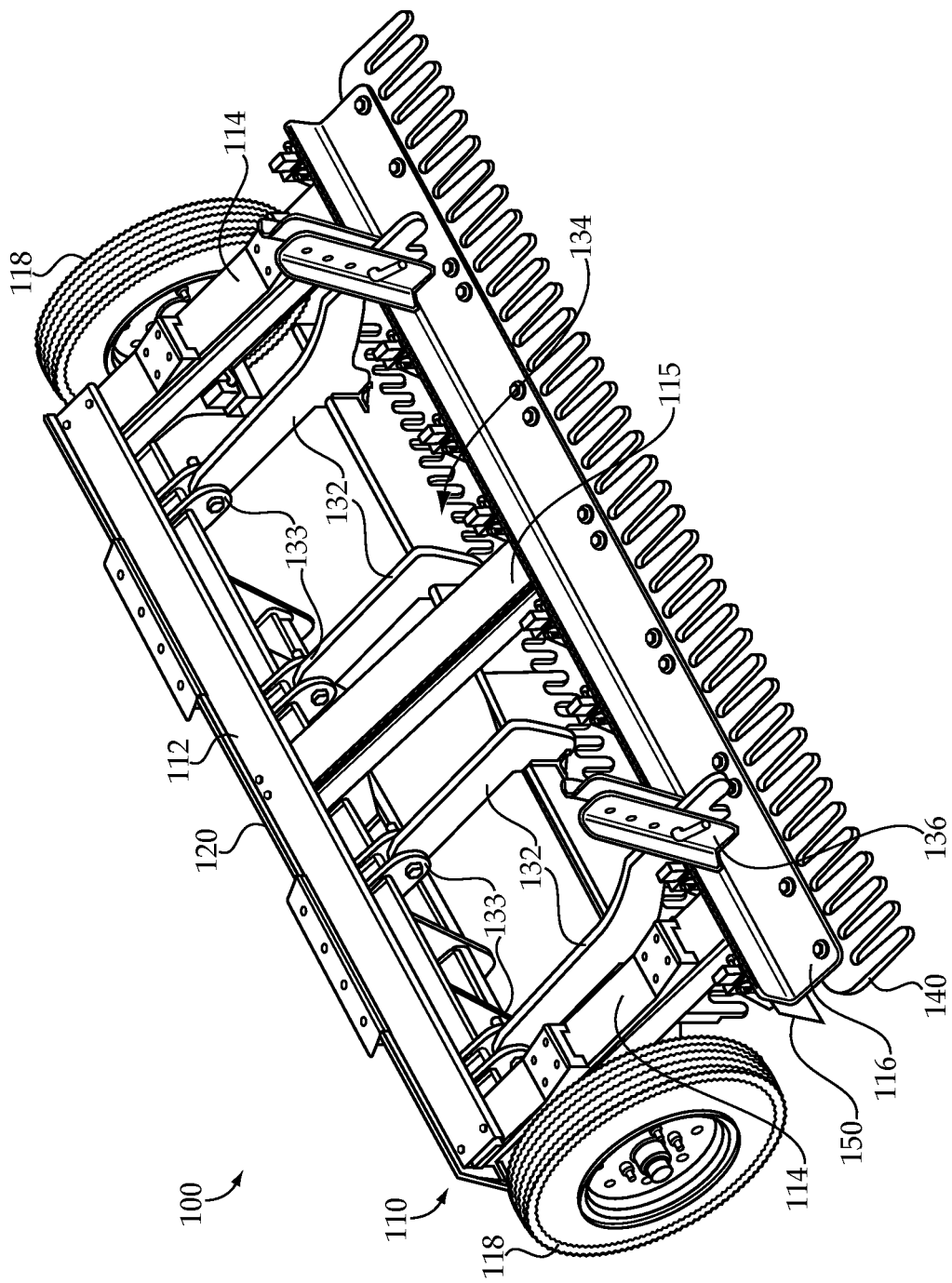
FIG. 1 is a perspective view of an exemplary grading tool.

With reference to FIG. 1 there is illustrated an exemplary grading tool 100 which includes frame 110, ground contacting wheels 118, comb 140, and drag bar assembly 134. Frame 110 includes rear frame member 112, front frame member 116, side frame members 114, and center frame member 115. Rear frame member 112 and front frame member 116 extend between first and second sides of grading tool 100 in a widthwise direction. Side frame members 114 and center frame member 115 extend between first and second ends of grading tool 100 in a lengthwise direction.

Figure 8:
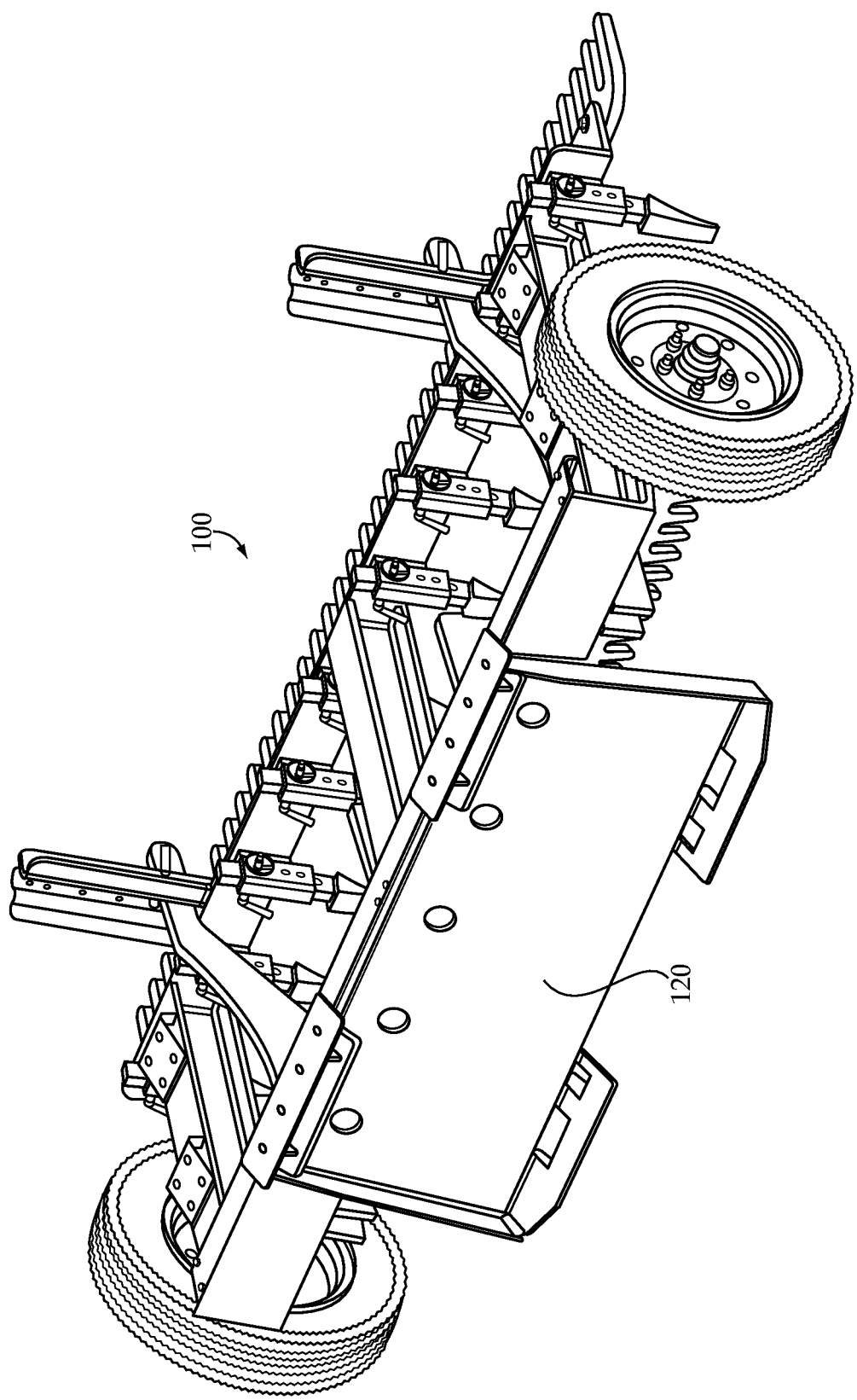
FIG. 8 is an additional view of the exemplary grading tool of FIG. 1.

Mounting member 120 is structured to be accessible from the rear of grading tool 100 and is coupled with rear frame member 112. Further details of mounting member 120 are illustrated in FIG. 8. Comb 140 is coupled with front frame member 116 and extends over a first distance in the widthwise direction. Comb 140 further includes a plurality of comb teeth extending over a second distance in the lengthwise direction. In the illustrated embodiment, comb 140 is comprised of a plurality of separate portions which are arranged adjacent one another and secured to front frame member 116. This allows combs of differing widths to be provided from a common set of parts. Other embodiments contemplate that a single piece comb may be utilized. Scarifying teeth 150 are also coupled with front frame member 116 at a location toward the rear of grading tool 100 relative to comb 140. Scarifying teeth 150 are structured to be adjustable and removable relative to frame 110.

Ground contacting wheels 118 are rotatably coupled with side frame members 114 and are structured to support the frame 110 relative to an underlying ground surface. In the illustrated embodiment, ground contacting wheels 118 are positioned within the first distance in the widthwise direction such that the ground contacting wheels 118 may travel over a portion of the ground surface which has been worked by comb 140.

Drag bar assembly 134 includes a plurality of arms 132 which are rotatably coupled to rear frame member 112 by hinges 133. Rotation of arms 132 about the hinges 133 allows the drag bar assembly to rotate so that it moves vertically relative to frame 110. Retention pin posts 136 extend vertically upward from front frame member 116 and are structured to receive retention pins at a plurality of holes provided through retention pin posts 136. The end portions of two of the drag bar arms 132 extend into a slot provided in retention posts 136 and are structured to contact the retention pins to limit their movement. The limit on movement of arms 132 may be varied by changing the position of the retention pins in retention pin posts 136.

Figure 2:
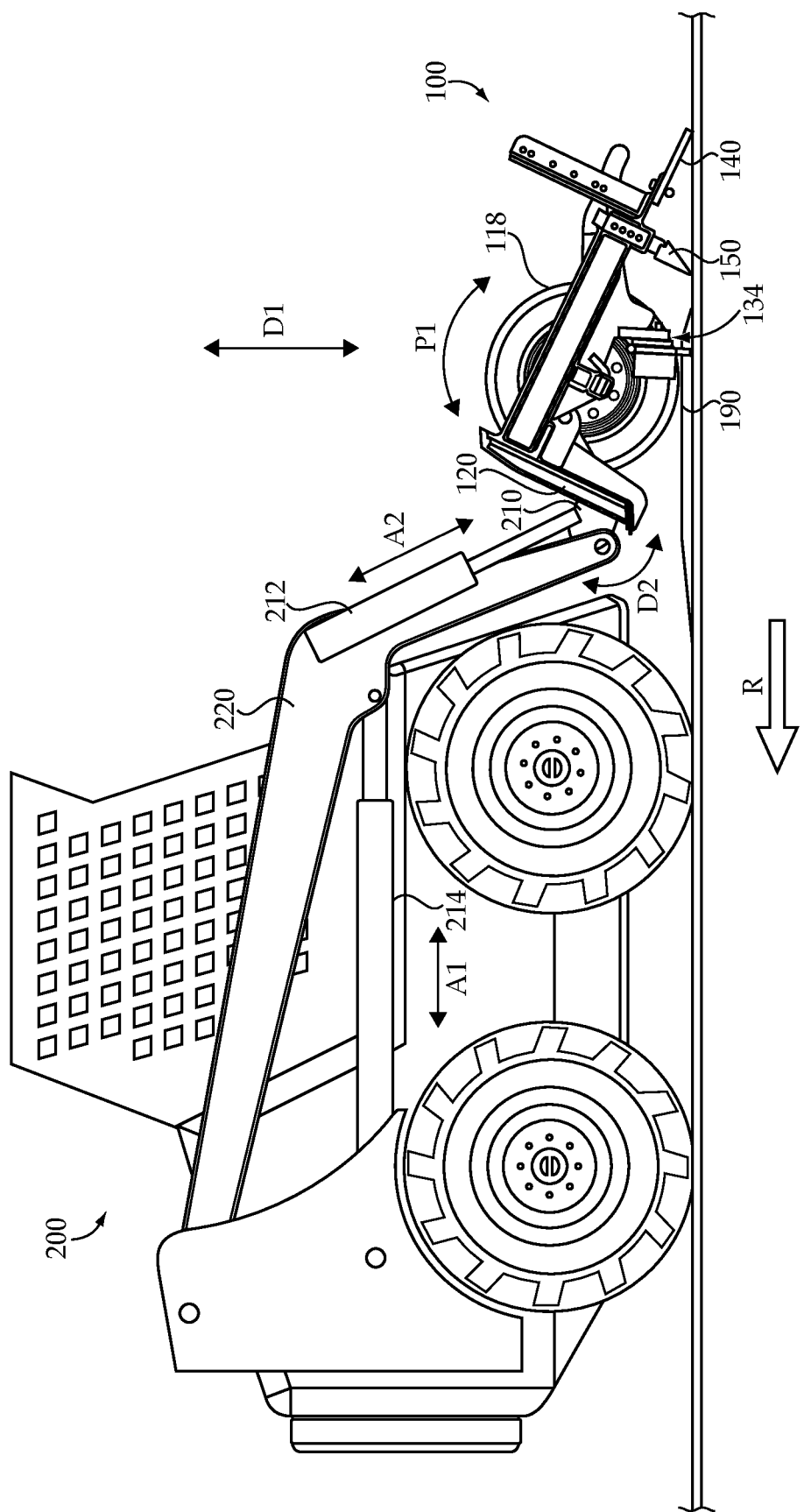
FIG. 2 is a side view of the exemplary grading tool of FIG. 1 coupled with a work machine.
Figure 4:
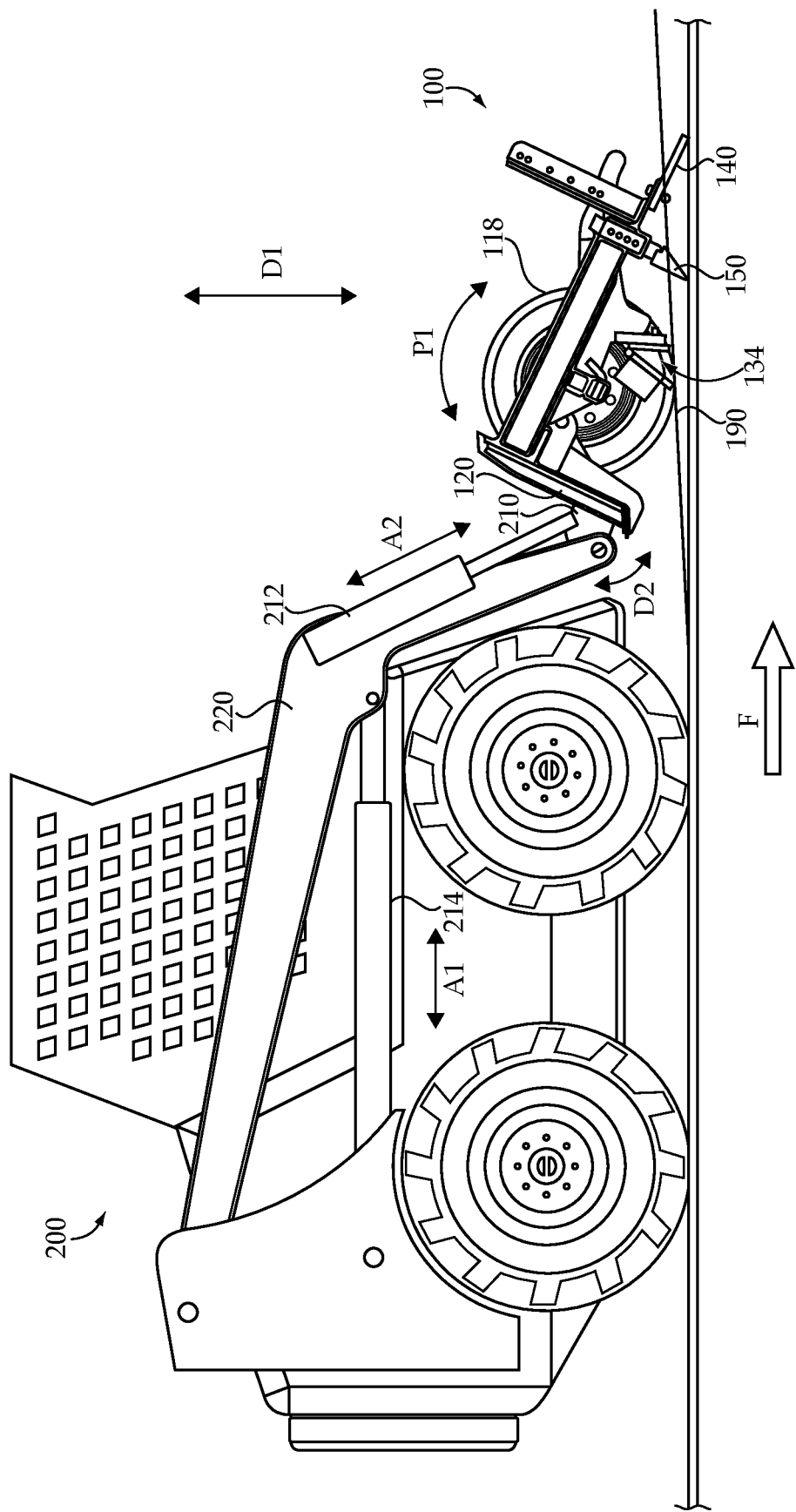
FIG. 4 is a side view of the exemplary grading tool of FIG. 1 coupled with a work machine.

With reference to FIGS. 2 and 4 there is illustrated a side view of grading tool 100 attached to an exemplary work machine 200. In the illustrated embodiment work machine 200 is a skid-steer, however, it shall be appreciated that grading tool 100 may be attached to a variety of work machines and vehicles, including tractors, front loaders and other machines or vehicles with a front tool mounting capability to name a few examples. Grading tool 100 is attached to work machine 200 by coupling tool mount 210 of work machine 200 with mounting member 120 of grading tool 100. Tool mount 210 is further coupled with lifting arm 220. Actuator 212 is coupled with and extends between tool mount 210 and lifting arm 220. Actuator 214 is coupled with and extends between lifting arm 220 and work machine 200. It shall be appreciated that the opposite side of work machine 200 includes a corresponding lifting arm and actuators which are not visible in the side view illustrated in FIG. 2.

Actuator 214 may be controlled by an operator of the work machine to apply force in the directions generally indicated by arrow A1 which is effective to raise and lower tool mount 210 and grading tool 100 in the directions generally indicated by arrow D1. Actuator 212 may be controlled by an operator to apply force to lifting arm 220 in the directions generally indicated by arrow A2 which is effective to rotate tool mount 210 in the directions generally indicated by arrow D2. In certain modes of operation this rotation may be effective to rotate grading tool 100 about the axis of ground contact by wheels 118 in the directions generally indicated by arrow P1 as is described in further detail below. In the illustrated embodiments actuators 212 and 214 are hydraulic actuators, though it shall be appreciated that a variety of types and configurations of actuators can be utilized to raise and lower lifting arm 220 and rotate tool mount 210.

Actuator 214 may be also controlled by an operator of the work machine such that lifting arm 220 allows grading tool 100 to move passively in the direction generally indicated by arrow D1 in response to external force. This operation is one example of a float mode of operation in which the ground contacting wheel 118 of grading tool 100 contact ground surface 190 and are allowed to move upward or downward as the grading tool is moved over a changing elevation of ground surface 190. During a float mode of operation, the actuator 212 may be controlled by an operator of the work machine 200 to vary the pitch of grading tool 100 by rotating the tool amount the axis of ground contacting wheel 118 generally in the directions indicated by arrow P1. Varying the pitch of grading tool 100 is effective to control the depth of penetration of comb 140 and scarifying teeth 150 into ground surface 190.

FIGS. 2 and 4 further illustrate the operation of work machine 200 and grading tool 100 reverse and forward directions, respectively. In the reverse mode illustrated in FIG. 2, work machine 200 and grading tool 100 move in reverse direction indicated by arrow R. In the reverse operation drag bar assembly 134 is utilized to comb the ground surface 190. In the forward mode illustrated in FIG. 4, work machine 200 and grading tool 100 move in forward direction indicated by arrow F. In forward operation the drag bar is permitted to rotate in the illustrated direction so as not to interfere with forward motion of grading tool 100.

Figure 3:
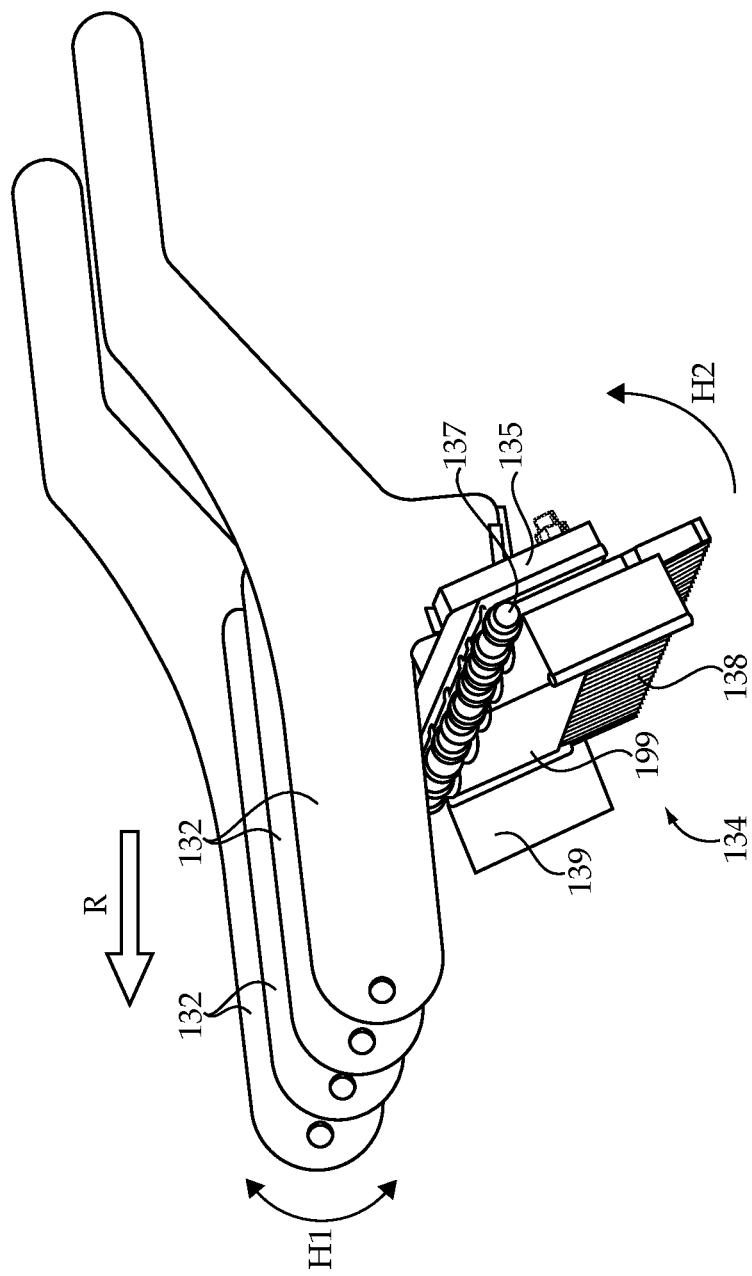
FIG. 3 is a more detailed perspective view of a drag bar assembly of the exemplary grading tool of FIG. 1.
Figure 5:
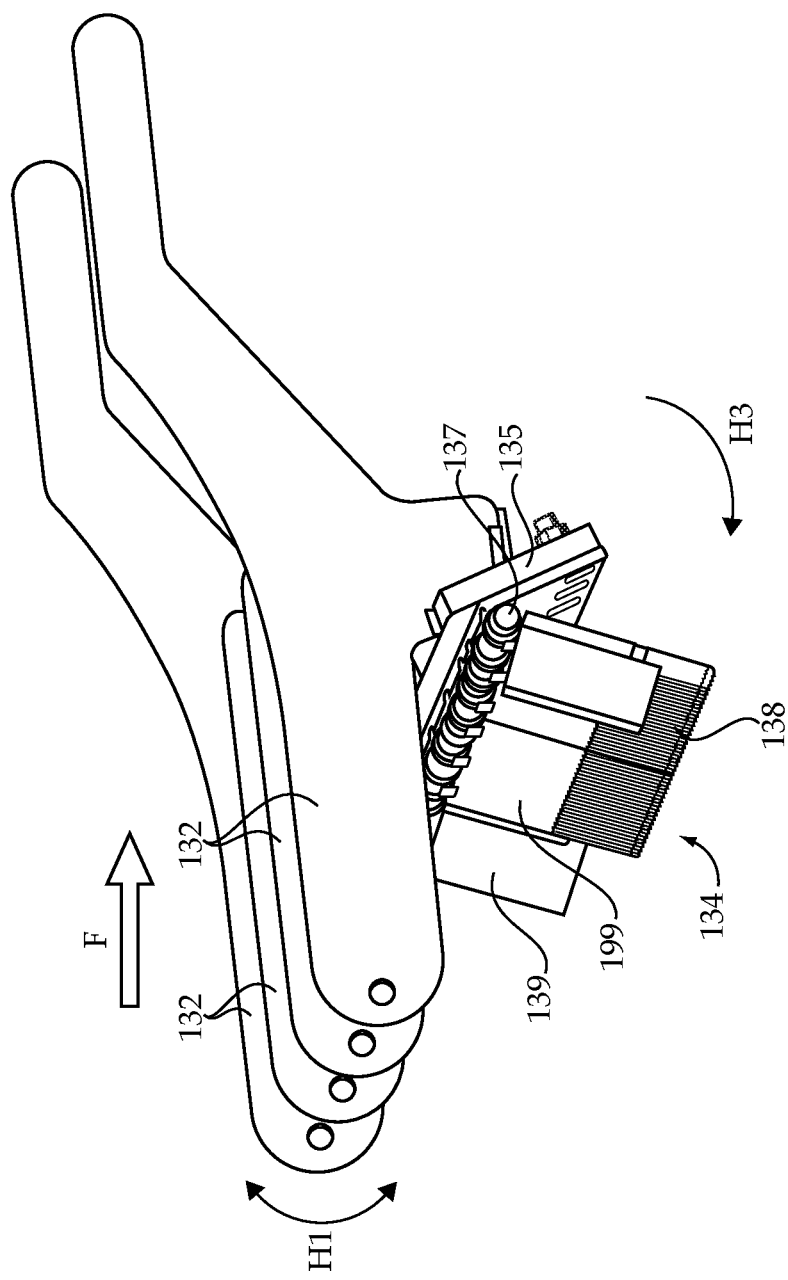
FIG. 5 is a more detailed perspective view of a drag bar assembly of the exemplary grading tool of FIG. 1.

FIGS. 3 and 5 illustrate further details of drag bar assembly 134. As illustrated therein, drag bar assembly 134 includes a plurality of arms 132 which are rotatably coupled to frame 110 as illustrated and described above in connection with FIG. 1. This rotatable connection allows arms 132 to rotate relative to frame 110 in the direction generally indicated by arrow H1 to permit upward and downward movement of drag bar assembly 134 relative to frame 110. Arms 132 are coupled with a carrier member 135 which is, in turn, rotatably coupled with drag bar 199 by hinge 137. Drag bar 199 includes a plurality of sifting teeth 138 extending downward therefrom and side members 139 which extend in a reverse direction at angles relative to drag bar 199.

As illustrated in FIG. 3, during reverse operation drag bar 199 rotates in the direction generally illustrated by arrow H2 due to contact with the underlying ground surface and is brought into contact with carrier member 135 which maintains drag bar 199 in the illustrated position. In the reverse mode of operation drag bar 199 may be utilized to sift the underlying ground surface and move constituent materials which do not pass through sifting teeth 138 in the reverse direction. Depending on the spacing and size of sifting teeth 138, this operation may be effective to sift debris such as rocks or gravel of varying sizes from the ground surface being worked while allowing smaller material to pass through sifting teeth 138. Comb 140 and scarifying teeth 150 penetrate ground surface 190 and the angle of drag bar 199 relative to the underlying ground surface and the penetration into the ground surface by comb 140 and scarifying teeth 150 may be controlled by varying the pitch of grading tool 100 as described above.

As illustrated in FIG. 5, during forward operation drag bar 199 rotates in the direction generally illustrated by arrow H3 due to contact with the underlying ground surface and is free to rotate away from carrier member 135, for example as shown in the illustrated position. In the forward mode of operation drag bar 199 may work the underlying ground surface to a lesser degree than in reverse mode of operation and preferably does not interfere with the operation of comb 140 or scarifying teeth 150. Penetration of comb 140 and scarifying teeth 150 into the underlying ground surface may be controlled by varying the pitch of grading tool 100 as described above.

It shall be appreciated grading tool 100 allows precise control over multiple different types of grading operations. In the forward direction illustrated in FIGS. 3 and 5 the penetration of the comb 140 into the ground surface may be precisely controlled by rotation of grading tool 100 about the axis of ground contacting wheels 118. This allows control over the amount earth which is moved or plowed in the forward direction. This control is independent of the position of the work machine 200 relative to the portion of the ground surface being worked. In the reverse direction illustrated in FIGS. 2 and 4, the penetration of sifting teeth 138 of drag bar 199 into the ground surface may be precisely controlled by rotation of grading tool 100 about the axis of ground contacting wheels 118. This allows precise control over the amount of ground moved in the reverse direction and the amount of sifting performed by sifting teeth 138. This control is also independent of the position of the work machine 200 relative to the portion of the ground surface being worked. Furthermore, forward and reverse control similar to that described for grading tool 100 may also be realized in connection with grading tools 300 and 400 described below.

Figure 6:
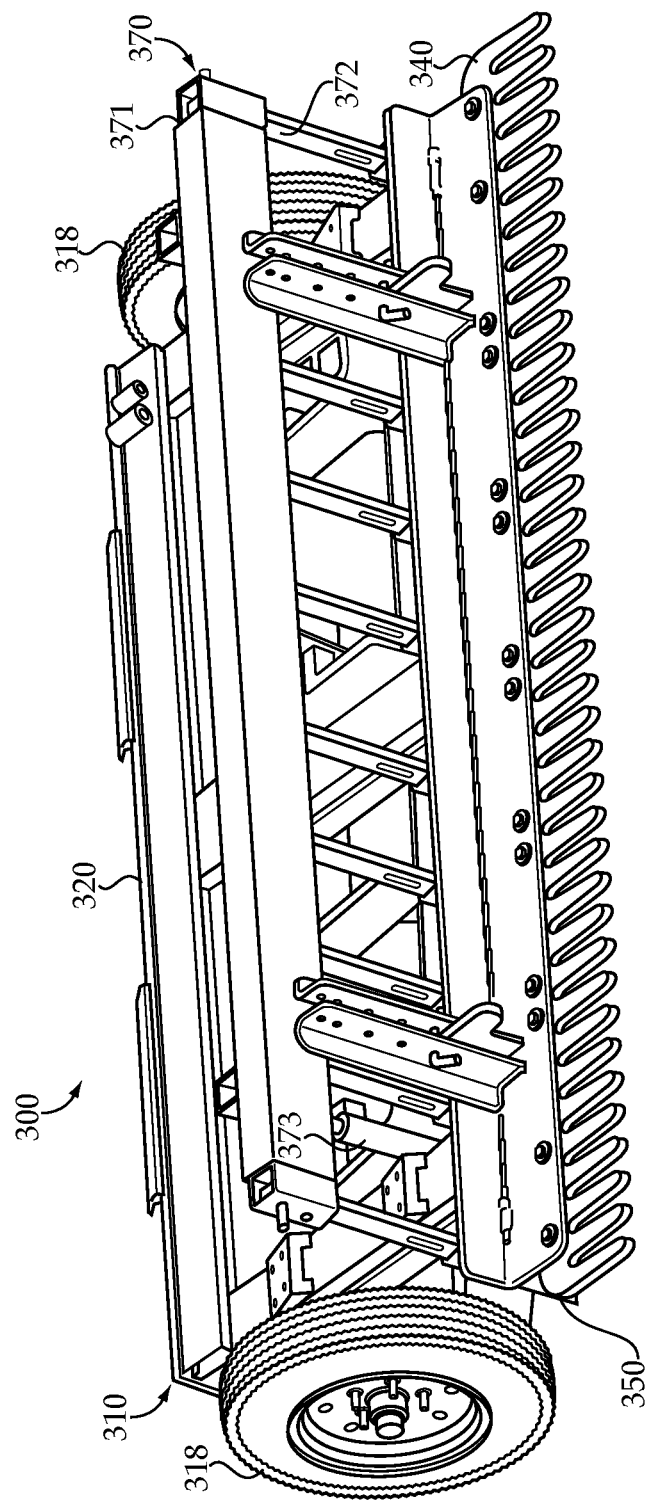
FIG. 6 is a perspective view of an additional exemplary grading tool.

An additional exemplary grading tool 300 is illustrated in FIG. 6. Grading tool 300 includes multiple substantially similar features as grading tool 100 a number of which are labeled with references numerals corresponding to FIG. 1, but incremented from the 100's to the 300's. Grading tool 300 further includes hydraulic assembly 370 which includes backstop member 371 and shanks 372 only one of which is labeled to preserve clarity of the illustration. Hydraulic assembly 370 further includes one or more hydraulic actuators 373 which may be actuated by a user to raise backstop member 371 and shanks 372 to the illustrated configuration or to lower backstop member 371 and shanks 372 toward frame 310. Shanks 372 are coupled with scarifying teeth 350 only one of which is visible in the illustrated view. The depth of penetration of scarifying teeth 350 into the underlying ground surface may be accomplished by raising and lowering backstop member 371 and shanks 372 with hydraulic actuators 373. Furthermore, in a forward mode of operation backstop 371 may provide additional capacity to push material of an underlying ground surface into which comb 340 penetrates while simultaneously providing some ability for material to pass behind backstop 371 in order to prevent grading tool 300 from becoming overloaded. Additionally, the illustrated configuration of backstop member 371 and shanks 372 provides an operator line of sight so that the position of comb 340 is visible to the operator.

Figure 7:
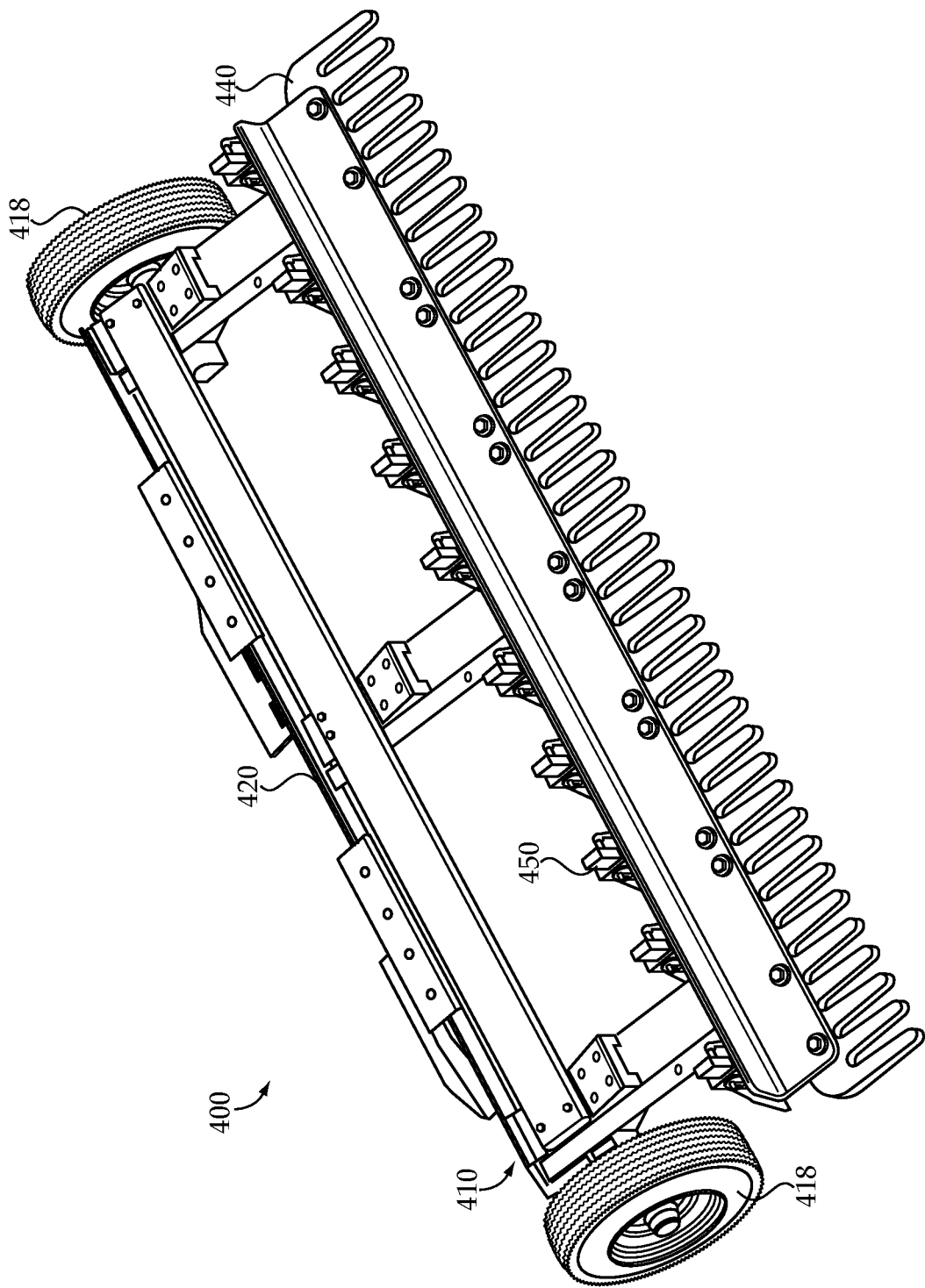
FIG. 7 is a perspective view of another exemplary grading tool.

An additional exemplary grading tool 400 is illustrated in FIG. 7. Grading tool 400 includes multiple substantially similar features as grading tool 100 a number of which are labeled with references numerals corresponding to FIG. 1, but incremented from the 100's to the 400's. In contrast to grading tool 100, grading tool 400 does not include a drag bar assembly. Nevertheless, grading tool 400 may be utilized in conjunction with a float mode of operation similar to that described in connection with grading tool 100.

A number of further non-limiting exemplary embodiments shall now be described. A first exemplary embodiment is an apparatus comprising: a grading tool comprising a frame, ground contacting wheels coupled with the frame, a comb coupled with the frame and extending from a first end of the frame, and a coupling member coupled with the frame and located proximate a second end of the frame, the second end of the frame being opposite the first end of the frame; and a work machine comprising a tool mount coupled with the coupling member, a first actuator configured to apply force to selectably raise and lower the grading tool relative to the work machine in an active mode and to allow the grading tool to passively raise and lower relative to the work machine in response to external force in a float mode, and a second actuator configured to selectably change a pitch of the grading tool relative to the work machine in both the active mode and the float mode; wherein when the first actuator is configured in the float mode with the ground contacting wheels in contact with the ground a depth of penetration of the comb into the ground surface is adjustable by the second actuator changing the pitch of the grading tool relative to the work machine.

In certain forms of the first exemplary embodiment the apparatus may comprise a drag bar assembly including a plurality of arms rotatably coupled with the frame, a carrier member coupled with the plurality of arms and extending in a direction along the width of the frame, and a drag bar rotatably coupled with the carrier member. In certain forms of the first exemplary embodiment when the grading tool is advanced in a first direction the drag bar assembly is structured to maintain the drag bar in a fixed position relative to the carrier member by opposing force applied to the drag bar assembly by the ground surface, and the plurality of arms are structured to rotate relative to the frame in response to force applied to the drag bar assembly effective to allow the drag bar assembly to raise and lower relative to the frame. In certain forms of the first exemplary embodiments when the grading tool is advanced in a second direction opposite the first direction the drag bar assembly is structured to allow the drag bar to rotate relative to the carrier member in response to force applied to the drag bar assembly by the ground surface. In certain forms of the first exemplary embodiment the drag bar includes a plurality of sifting teeth structured to engage the ground surface when the grading tool is advanced in the first direction.

In certain forms of the first exemplary embodiment the apparatus may comprise a backstop member extending in a direction along the width of the frame, a hydraulic actuator configured to raise and lower the backstop member relative to the frame, and a plurality of scarifying teeth coupled with the backstop member, wherein raising and lowering the backstop member relative to the frame with the hydraulic actuator is effective to vary the depth of penetration of the scarifying teeth into the ground surface. In certain forms of the first exemplary embodiment the comb extends over a first distance along a width of the frame and the ground contacting wheels are positioned to contact the ground within the first distance. In certain forms of the first exemplary embodiment the work machine comprises a skid steer, and the second end of the frame faces the skid steer. In certain forms of the first exemplary embodiment the first actuator and the second actuator comprise hydraulic actuators.

A second exemplary embodiment is grading tool structured for attachment to a work machine, the grading tool comprising: a frame; first and second ground contacting wheels coupled with the frame at first and second locations spaced apart along the width of the frame, the first and second ground contacting wheels being rotatable relative to the frame about an axis extending along the width of the frame, the axis being positioned rearward from a first end of the frame and forward of a second end of the frame; a comb coupled with the frame and extending from the first end of the frame; and a coupling member coupled with the frame and positioned closer to the second end of the frame than the first end of the frame, wherein when the ground contacting wheels are in contact with the ground a depth of penetration of the comb into the ground surface is adjustable by changing the pitch of the frame relative to the wheels by applying force to the coupling member.

In certain forms of the second exemplary embodiment the grading tool comprises a double-hinged drag bar assembly coupled with the frame and including a drag bar positioned intermediate the first end and the second end of the frame, a first hinge accommodating rotation of the drag bar assembly about a first axis, and a second hinge accommodating rotation of a plurality of sifting teeth of the drag bar about a second axis. In certain forms of the second exemplary embodiment when the grading tool is advanced in a first direction the second hinge is structured to maintain the drag bar in a fixed position and when the grading tool is advanced in a second direction opposite the first direction the second hinge is structured to allow rotation of the drag bar about the second axis. In certain forms of the second exemplary embodiment the first hinge is structured to allow the drag bar assembly to rotate about the first axis when the grading tool is advanced in both the first direction and the second direction. In certain forms of the second exemplary embodiment the drag bar assembly includes a plurality of arms extending along a length of the frame between the first end and the second end of the frame and rotatably coupled with the frame by the first hinge, a carrier member coupled with the plurality of arms and extending in a direction along the width of the frame, and the drag bar is rotatably coupled with the carrier member by the second hinge.

A third exemplary embodiment is a method comprising: providing a grading tool comprising a frame, ground contacting wheels coupled with the frame, and a comb extending from a first end of the frame; attaching the grading tool to a work machine with the work machine facing a second end of the frame opposite the first end of the frame; operating the work machine in a first operating mode with the ground contacting wheels in contact with a ground surface wherein the grading tool can move freely up or down relative to the work machine in response to external force applied to the grading tool; adjusting a pitch of the grading tool in the first mode effective to vary a depth of penetration of the comb into the ground surface.

In certain forms of the third exemplary embodiment the method comprises operating the work machine in a second operating mode wherein the grading tool is raised vertically relative to the work machine and the ground contacting wheels are spaced apart from the ground surface. In certain forms of the third exemplary embodiment the grading tool further comprises a double-hinged drag bar assembly including a drag bar positioned intermediate the first end and the second end of the frame, a first hinge accommodating rotation of the drag bar about a first axis, and a second hinge accommodating rotation of the drag bar assembly about a second axis. In certain forms of the third exemplary embodiment in the first operating mode when the grading tool is advanced in a first direction the first hinge is structured to maintain the drag bar in a fixed position and when the grading tool is advanced in a second direction opposite the first direction the first hinge is structured to allow rotation of a plurality of sifting teeth of the drag bar about the first axis. In certain forms of the third exemplary embodiment the second hinge is structured to allow the drag bar assembly to rotate about the second axis when the grading tool is advanced in both the first direction and the second direction. In certain forms of the third exemplary embodiment in the first operating mode advancing the grading tool in the first direction is effective to move a first portion of the ground surface in the first direction with the drag bar, and advancing the grading tool in the second direction is effective to move a second portion of the ground surface greater than the first portion in the second direction with the comb.

A fourth exemplary embodiment is an apparatus comprising: a grading tool comprising a frame, ground contacting wheels coupled with the frame, a comb coupled with the frame and extending from a first end of the frame, and a coupling member coupled with the frame and configured to be accessible from a second end of the frame; and a work machine comprising a tool mount coupled with the coupling member, a first actuator configured to apply force to selectably raise and lower the grading tool relative to the work machine in an active mode and to allow the grading tool to passively raise and lower relative to the work machine in response to external force in a float mode, and a second actuator configured to selectably change a pitch of the grading tool relative to the work machine; wherein when the first actuator is configured in the float mode with the ground contacting wheels in contact with the ground a depth of penetration of the comb into the ground surface is adjustable by the second actuator changing the pitch of the grading tool relative to the work machine.

In certain forms of the fourth exemplary embodiment the apparatus may comprise a drag bar assembly including a plurality of arms rotatably coupled with the frame, a carrier member coupled with the plurality of arms and extending in a direction along the width of the frame, and a drag bar rotatably coupled with the carrier member. In certain forms of the fourth exemplary embodiment when the grading tool is advanced in a first direction the drag bar assembly is configured to maintain the drag bar in a fixed position relative to the carrier member effective to engage a ground surface, and the plurality of arms are configured to rotate relative to the frame effective to allow the drag bar assembly to raise and lower relative to the frame. In certain forms of the fourth exemplary embodiment when the grading tool is advanced in a second direction opposite the first direction the drag bar assembly is configured to rotate the drag bar relative to the carrier member in response to contact between the drag bar and the ground surface. In certain forms of the fourth exemplary embodiment the drag bar includes a plurality of sifting teeth configured to engage a ground surface when the grading tool is advanced in the first direction.

In certain forms of the fourth exemplary embodiment the apparatus may comprise a backstop member extending in a direction along the width of the frame, a hydraulic actuator configured to raise and lower the backstop member relative to the frame, and a plurality of scarifying teeth coupled with the backstop member, wherein raising and lowering the backstop member relative to the frame with the hydraulic actuator is effective to vary the depth of penetration of the scarifying teeth into an underlying ground surface. In certain forms of the fourth exemplary embodiment the comb extends over a first distance along a width of the frame and the ground contacting wheels are positioned to contact the ground within the first distance. In certain forms of the fourth exemplary embodiment the work machine comprises a skid steer, and the second end of the frame faces the skid steer. In certain forms of the fourth exemplary embodiment the first actuator and the second actuator comprise hydraulic actuators.

A fifth exemplary embodiment is grading tool configured for attachment to a work machine, the grading tool comprising: a frame; a plurality of ground contacting wheels coupled with the frame; a comb coupled with the frame and extending from a first end of the frame; and a coupling member coupled with the frame and configured to be accessible from a second end of the frame; wherein when the ground contacting wheels are in contact with the ground a depth of penetration of the comb into the ground surface is adjustable by changing the pitch of the grading tool. In certain forms of the fifth exemplary embodiment the grading tool further comprises a double-hinged drag bar assembly including a drag bar positioned intermediate the first end and the second end of the frame, a first hinge accommodating rotation of the drag bar about a first axis, and a second hinge accommodating rotation of a plurality of sifting teeth of the drag bar about a second axis. In certain forms of the fifth exemplary embodiment when the grading tool is advanced in a first direction the second hinge is configured to maintain the drag bar in a fixed position and when the grading tool is advanced in a second direction opposite the first direction the second hinge is configured to allow rotation of the drag bar about the second axis. In certain forms of the fifth exemplary embodiment the first hinge is configured to allow the drag bar assembly to rotate about the second axis when the grading tool is advanced in both the first direction and the second direction. In certain forms of the fifth exemplary embodiment the drag bar assembly includes a plurality of arms rotatably coupled with the frame by the first hinge, a carrier member coupled with the plurality of arms and extending in a direction along the width of the frame, and a drag bar rotatably coupled with the carrier member by the second hinge.

A sixth exemplary embodiment is method comprising: providing a grading tool comprising a frame, ground contacting wheels coupled with the frame, and a comb extending from a first end of the frame; attaching the grading tool to a work machine with the work machine facing a second end of the frame opposite the first end of the frame; operating the work machine in a first operating mode with the ground contacting wheels in contact with a ground surface wherein the grading tool can move freely up or down relative to the work machine in response to external force applied to the grading tool; adjusting a pitch of the grading tool in the first mode effective to vary a depth of penetration of the comb into the ground surface.

In certain forms of the sixth exemplary embodiment the method further comprises operating the work machine in a second operating mode wherein the grading tool is raised vertically relative to the work machine and the ground contacting wheels are moved apart from the ground surface. In certain forms of the sixth exemplary embodiment the grading tool further comprises a double-hinged drag bar assembly including a drag bar positioned intermediate the first end and the second end of the frame, a first hinge accommodating rotation of the drag bar about a first axis, and a second hinge accommodating rotation of the drag bar assembly about a second axis. In certain forms of the sixth exemplary embodiment in the first operating mode when the grading tool is advanced in a first direction the first hinge is configured to maintain the drag bar in a fixed position and when the grading tool is advanced in a second direction opposite the first direction the first hinge is configured to allow passive rotation of a plurality of sifting teeth of the drag bar about the first axis. In certain forms of the sixth exemplary embodiment the second hinge is configured to allow the drag bar assembly to rotate about the second axis when the grading tool is advanced in both the first direction and the second direction. In certain forms of the sixth exemplary embodiment the first operating mode advancing the grading tool in the first direction is effective to move a first portion of the ground surface in the first direction with the drag bar, and advancing the grading tool in the second direction is effective to move a second portion of the ground surface greater than the first portion in the second direction with the comb.

It shall be understood that the exemplary embodiments summarized and described in detail and illustrated in the figures are illustrative and not limiting or restrictive. Only the presently preferred embodiments have been shown and described and all changes and modifications that come within the scope of the invention are to be protected. It shall be appreciated that the embodiments and forms described above may be combined in certain instances and may be exclusive of one another in other instances. Likewise, it shall be appreciated that the embodiments and forms described above may or may not be combined with other aspects and features. It should be understood that various features and aspects of the embodiments described above may not be necessary and embodiments lacking the same are also protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A grading tool structured for coupling with a work machine, the grading tool comprising:
    a frame having a width extending from a first side to a second side and a length extending from a first end to a second end;
    first and second ground contacting members coupled with the frame at first and second locations along the width of the frame and being rotatable relative to the frame;
    a multi-hinged drag bar assembly including:
    a plurality of arms rotatably coupled with the frame by respective first hinges,
    a carrier member coupled with the plurality of arms, the carrier member extending downward from the plurality of arms toward an underlying ground surface, extending along the width of the frame, and including a first surface extending vertically toward the underlying ground surface and facing toward the first end of the frame,
    a drag bar rotatably coupled with the carrier member by a second hinge, the drag bar including an upper portion coupled with the second hinge and extending along the width of the frame, a lower portion extending along the width of the frame and defining a plurality of teeth extending downward from the upper portion, and a second surface facing toward the first surface of the carrier member, the drag bar being rotatable about the second hinge from a first position in which the surface of the drag bar is parallel with and abuts the first surface of the carrier to limit rotation of the drag bar to a second position in which the second surface is at an angle relative to and spaced apart from the first surface, and the plurality of teeth being structured such that rotation of any of the plurality of teeth causes corresponding rotation of all of the plurality of teeth.

2. The grading tool of claim 1 comprising: a comb coupled with and extending from the frame.

3. The grading tool of claim 2 wherein, when the ground contacting members are in contact with the ground, a depth of penetration of the comb into the ground surface is adjustable by adjusting the pitch of the frame.

4. The grading tool of claim 1 comprising: a plurality of scarifying shanks adjustably coupled with and extending downward from the frame.

5. The grading tool of claim 1 wherein the drag bar is a straight structure without bends.

6. The grading tool of claim 1 wherein the first end of the frame is a rear end of the frame and the first surface faces the rear end of the frame.

7. The grading tool of claim 1 comprising a work machine coupled with the grading tool.

8. The grading tool of claim 7 wherein the work machine comprises: a first actuator configured to apply force to selectably raise and lower the grading tool relative to the work machine, and a second actuator configured to selectably change a pitch of the grading tool relative to the work machine.

9. A tool for attachment to a work machine, the tool comprising:
    a frame having a width extending from a first side to a second side and a length extending from a front end to a rear end;
    first and second ground contacting members coupled with and rotatable relative to the frame;
    a double-hinged drag bar assembly including
    a plurality of arms rotatably coupled with the frame by one or more first hinges,
    a carrier member coupled with the plurality of arms, the carrier member extending downward from the plurality of arms toward an underlying ground surface and extending along the width of the frame,
    a drag bar rotatably coupled with the carrier member by one or more second hinges, the drag bar including an upper portion coupled with the one or more second hinges and extending along the width of the frame, and a lower portion extending along the width of the frame and extending downward from the upper portion,
    wherein the drag bar is unbiased relative to the carrier member and freely rotatable about the one or more second hinges from a first position in which a first surface of the drag bar contacts the carrier to limit rotation of the drag bar to a second position in which the drag bar is rotated away from the carrier,
    wherein the drag bar rotates about the one or more second hinges as a unitary structure such that rotation of any of portion of the drag bar rotates all portions of the drag bar, and
    wherein the lower portion of the drag bar defines a plurality of teeth extending downward from the upper portion.

10. The tool of claim 9 wherein the plurality of teeth extend downward past the carrier member toward an underlying ground surface.

11. The tool of claim 9 wherein the first surface of the drag bar faces the front end of the frame.

12. The tool of claim 9 wherein the plurality of teeth penetrates vertically into the underlying ground surface in the first position and rest at an angle against the underlying ground surface in the second position.

13. The tool of claim 9 configured such that the tool is coupled with the work machine.

14. A soil working apparatus comprising:
a frame having a width extending from a first side to a second side and a length extending from a front end of the frame to a rear end of the frame;
first and second ground contacting members coupled with and rotatable relative to the frame;
a double-hinged drag bar assembly including
a plurality of arms rotatably coupled with the frame by one or more first hinges,
a carrier member coupled with the plurality of arms, the carrier member extending downward from the plurality of arms toward an underlying ground surface and extending along the width of the frame,
a drag bar rotatably coupled with the carrier member by one or more second hinges, the drag bar including an upper portion coupled with the one or more second hinges and extending along the width of the frame, and a lower portion extending along the width of the frame and extending downward from the upper portion,
wherein the drag bar is unbiased relative to the carrier member and freely rotatable about the one or more second hinges from a first position in which the first surface of the drag bar contacts the carrier to limit rotation of the drag bar to a second position in which the drag bar is rotated away from the carrier,
wherein the drag bar rotates about the one or more second hinges as a unitary structure, and
wherein the lower portion of the drag bar defines a plurality of teeth extending downward from the upper portion.

15. The soil working apparatus of claim 14 wherein the lower portion of the drag bar defines a plurality of teeth extending downward from the upper portion.

16. The soil working apparatus of claim 14 wherein the first surface of the drag bar faces the front end of the frame when the drag bar contacts the carrier.

17. The soil working apparatus of claim 15 wherein the plurality of teeth extends downward past the carrier member toward an underlying ground surface.

18. The soil working apparatus of claim 15 wherein the plurality of teeth penetrate vertically into the underlying ground surface in the first position and rest at an angle against the underlying ground surface in the second position.

19. The soil working apparatus of claim 14 structured such that the soil working apparatus is coupled with a work machine.

* * * * *